(12) United States Patent
Richardson et al.

(10) Patent No.: US 6,900,755 B2
(45) Date of Patent: May 31, 2005

(54) AUTOMOTIVE RADAR SYSTEMS

(75) Inventors: Michael Richard Richardson, Romsey (GB); Gareth Liam Harris, Southhampton (GB); David Herbert Brandwood, Southhampton (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 10/297,095

(22) PCT Filed: May 31, 2001

(86) PCT No.: PCT/EP01/06284

§ 371 (c)(1),
(2), (4) Date: Jul. 11, 2003

(87) PCT Pub. No.: WO01/92912

PCT Pub. Date: Dec. 6, 2001

(65) Prior Publication Data

US 2004/0027272 A1 Feb. 12, 2004

(30) Foreign Application Priority Data

May 31, 2000 (GB) ............................... 0013029

(51) Int. Cl.⁷ ........................... G01S 7/40; G01S 13/93; B60K 31/00
(52) U.S. Cl. .......................... 342/174; 342/70; 342/104; 342/107; 342/118; 342/147; 342/165; 342/173; 342/175; 342/195
(58) Field of Search ............................... 180/167–179; 342/27, 28, 70–72, 104, 107–115, 118, 128–133, 146, 147, 165–175, 192–197, 148–158, 73–82, 89, 420–426

(56) References Cited

U.S. PATENT DOCUMENTS 3,128,466 A * 4/1964 Brown et al. ................ 342/420
3,582,950 A * 6/1971 Tanaka et al. ............... 342/422
3,699,324 A * 10/1972 Iliff et al. ..................... 342/426
3,794,998 A * 2/1974 Pearson et al. ............. 342/151
4,160,975 A * 7/1979 Steudel ........................ 342/89
4,368,468 A * 1/1983 Lisle et al. .................. 342/151
4,800,387 A * 1/1989 Joy ............................. 342/165
5,070,336 A * 12/1991 Pringle ........................ 342/151
5,107,269 A * 4/1992 Labozzetta .................... 342/77
5,495,254 A    2/1996 Uemura et al. ............. 342/174
5,633,642 A    5/1997 Hoss et al. ................... 342/70
5,670,963 A    9/1997 Kubota et al. ............... 342/70
5,977,906 A * 11/1999 Ameen et al. .............. 342/174
6,411,252 B1 * 6/2002 Grace ........................ 342/174
6,476,760 B1 * 11/2002 Winter et al. .............. 342/173
6,535,160 B1 * 3/2003 Myers et al. ................ 342/81

FOREIGN PATENT DOCUMENTS

| DE | 197 51 004 A1 | 11/1997 |
| EP | 0 557 945 A2 | 2/1993 |
| EP | 0 782 008 A2 | 12/1996 |
| EP | 0 899 581 A3 | 7/1998 |
| EP | 0 899 581 A2 | 7/1998 |
| GB | 2 320 153 A | 6/1998 |
| GB | 2 334 842 A | 9/1999 |
| WO | WO 99/26082 | 5/1999 |

OTHER PUBLICATIONS

International Search Report.
British Search Report.

* cited by examiner

Primary Examiner—Bernarr E. Gregory
(74) Attorney, Agent, or Firm—Crowell & Moring LLP

(57) ABSTRACT

An automobile radar which serves to provide data for cruise control or other systems in a host vehicle, comprising means for measuring radar boresight misalignment by detecting the presence of apparent variations in the spacing of stationary objects from the direction of motion of the host vehicle and utilizing such detection to compensate for any misalignment.

8 Claims, 1 Drawing Sheet

AUTOMOTIVE RADAR SYSTEMS

BACKGROUND OF THE INVENTION

This invention relates to automotive radar systems and more especially but not exclusively it relates to automotive cruise control systems which use radar.

In recent years there has been much interest in the development of an adaptive cruise control system for automobiles, more especially for motorway use. Such a system involves measuring the speed of a host vehicle in which the system is fitted, and the distance of the host vehicle from a vehicle in front in the same lane. Cruise control then operates to control the speed of the host vehicle in order to maintain a safe distance from the car in front and to ensure that a predetermined maximum speed is not exceeded. An obvious method of measuring the speed and/or the range of the car in front is to use radar. It is clear that radar suitable for this purpose must not only have very good angular resolution, since it must be able to discriminate with confidence at long range between a vehicle in front in the same lane as the host vehicle, from a vehicle in front in an adjacent lane, but moreover must have very accurate radar boresight alignment with the direction of travel of the host vehicle.

Good angular resolution can be provided using known narrow beam radar techniques but hitherto the necessary boresight alignment accuracy has been much more difficult, if not impossible to achieve reliably and in a relatively simple manner which lends itself to use in the mass production of automobiles.

SUMMARY OF THE INVENTION

It is an important object of this invention to provide an automobile radar system wherein the radar boresight is effectively aligned accurately with respect to the direction of travel of a host vehicle and which is suitable for application to mass production.

According to the present invention as broadly conceived, an automobile radar which serves to provide data for cruise control or other systems in a host vehicle, comprises means for measuring radar boresight misalignment by detecting the presence of apparent variations in the spacing of stationary objects from the direction of motion of the host vehicle and utilising such detection to compensate for any misalignment.

According to one embodiment of the invention, an automobile radar which serves to provide data for cruise control or other systems in a host vehicle, comprises radar apparatus for measuring the bearing of vehicles and other objects in front of the host vehicle and for measuring the distance of such vehicles/objects from the host vehicle, a radar Doppler filter for measuring the relative speed of vehicles/objects in front of the host vehicle, a host vehicle speed sensor, stationary object identifier means which identifies as stationary objects, those objects whose relative speed is equal and opposite to the host vehicle speed as sensed, and computer means which, in dependence upon the change of bearing with range of stationary objects thus identified, detects misalignment of the radar boresight with respect to the direction of motion of the host vehicle and applies an appropriate correction.

The system may be arranged to recognise, as radar returns from a vehicle ahead in the same lane, only those radar returns which are received in a predetermined narrow beam centred on the direction of motion of the host vehicle, the aforesaid appropriate correction comprising offsetting the beam so that boresight misalignment is compensated for, whereby the boresight is aligned with the direction of motion.

The system may thus be arranged to take account only of radar returns from within a predetermined narrow angle centred on the direction of vehicle motion taking into account any angular boresight misalignment.

It will be apparent that when the radar boresight is aligned with the direction of motion of the host vehicle, the distance to one side of stationary objects, such as lamp posts and crash barriers, as measured in dependence upon the rate of change of bearing with range, will remain constant, and thus the detection of apparent changes in this distance can be used to detect any boresight misalignment and to correct for it as appropriate.

Although an automobile radar in accordance with this invention is eminently suitable for use with a cruise control system, it is envisaged that it may also be suitable for use with other control systems such as automated emergency breaking systems utilising radar to identify the presence of objects in the path of a vehicle which might represent a collision hazard.

A cruise control system which embodies a radar system according to the invention may comprise other sensors for measuring or detecting various vehicle parameters.

Such sensors may include, a brake pressure sensor, a gear box sensor, a steering angle sensor, and a throttle sensor.

The steering angle sensor may be used in a radar according to the invention to provide data indicative of a deviation from a normal forward motion direction of the host vehicle thereby to provide data appertaining to curved directions of host vehicle travel which can be taken into account as appropriate when applying corrections.

Other objects, advantages and novel features of the present invention will become apparent from the following detailed description of the invention when considered in conjunction with the accompanying drawings.

DETAILED DESCRIPTION OF THE DRAWINGS

Figure 1:
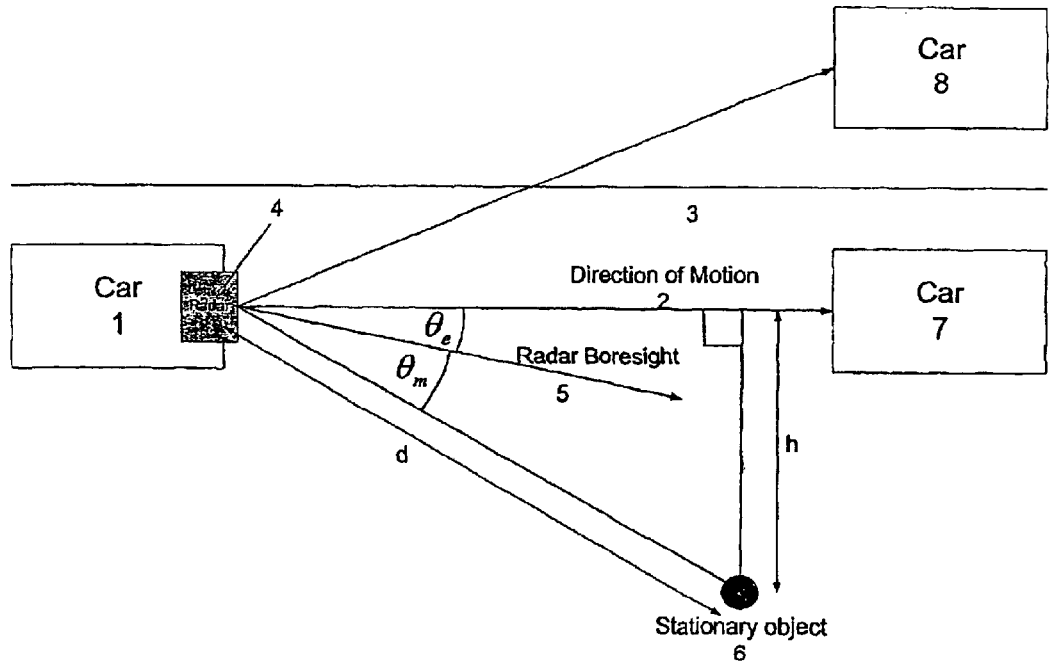
FIG. 1, is a diagram of a host vehicle in which an automobile radar system is fitted.

Referring now to FIG. 1, a host car 1, travelling in a direction 2, along a motorway lane 3, is fitted with a radar system 4, which is used to detect the presence, range and speed, of vehicles ahead in the same lane, and which forms a part of a cruise control system. The radar system produces a narrow beam along a boresight 5, which is unintentionally offset due to production misalignment, from the direction of motion of the host car 1, by an azimuth angle $\theta_e$ so that radar returns from a stationary object 6, appear to originate from a target at an azimuth angle of $\theta_m$. It is clear that if a car 7, in front and in the same lane as the host car 1, is to be reliably distinguished from vehicles in adjacent lanes, such as the car 8, for example, the effect of this offset must be compensated for.

It is apparent that a distance h, by which the stationary object 6, is spaced orthogonally from the direction of motion 2, will remain constant as measured by the radar provided its boresight 5, is aligned with the direction of motion 2. Thus it is clear that any apparent change in the distance h, as measured by the radar taking account of the change in the angle $\theta_m$, with range, may be used as basis for calculating a beam correction factor, and a system for doing this will now be described with reference to FIG. 2.

Figure 2:
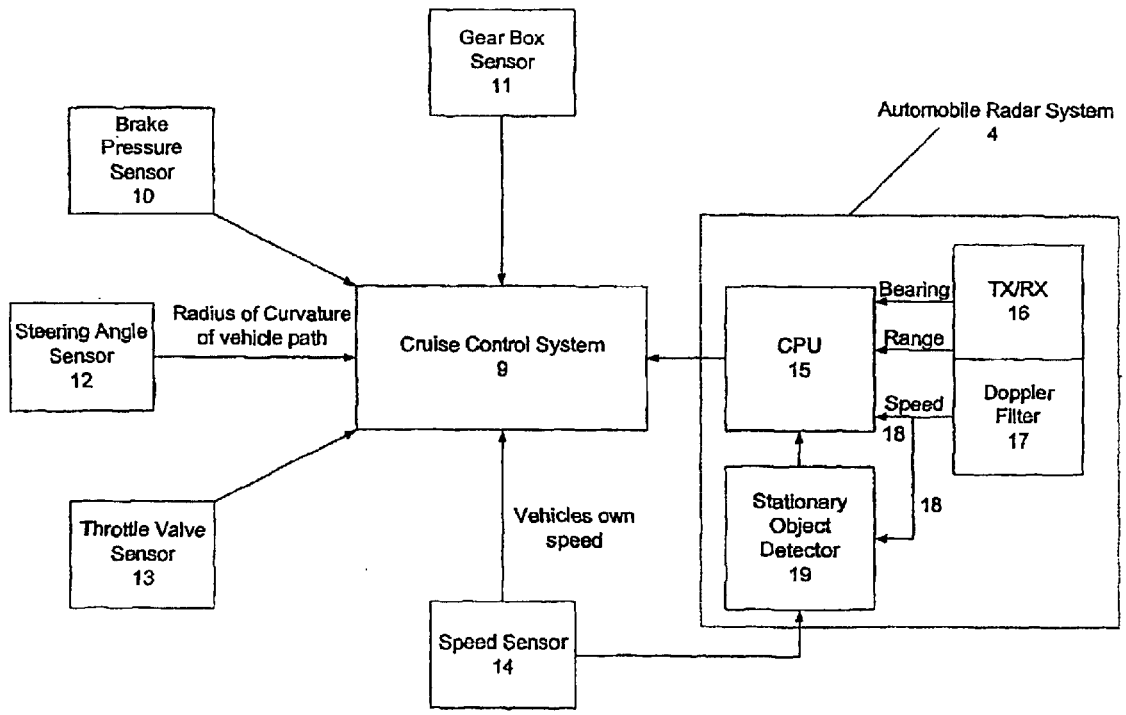
FIG. 2, is a block schematic diagram of a cruise control system embodying the radar system shown in FIG. 1.

Referring now to FIG. 2, a cruise control system 9, receives data from a brake pressure sensor 10, a gear box sensor 11, a steering angle sensor 12, a throttle sensor 13, a host vehicle speed sensor 14, and the radar system 4, shown in FIG. 1. The cruise control system itself is not central to this invention and will therefore not be described in great detail general herein. It conventionally receives data from a plurality of sensors which included the radar system 4, which comprises a CPU 15, fed with target range, and bearing data from a radar tx/rx 16, and target speed relative to host vehicle speed, from a doppler filter 17, via a line 18. This line 18, is also arranged to feed a stationary object detector 19, which also receives data from the speed sensor 14, and recognises stationary objects as those having an apparent speed which is equal and opposite to the speed of the host vehicle. Data appertaining to the detection of stationary objects is fed from the stationary object detector 19, to the CPU 15, which, taking account of the change of bearing with range, computes a correction factor so that only those radar returns from the direction of motion 2, are recognised as range and speed data appertaining to a vehicle ahead in the same lane, and routed as appropriate to the cruise control system 9.

The manner in which the CPU operates to compute the necessary correction factor is as follows.

Let $\theta_e$=Angular alignment error of radar $\theta_m$=Measured azimuth angel of target d=Range of target h=Distance of closest approach to target If the vehicle is travelling in a straight line the distance h will remain constant. However, if the radar is not perfectly aligned, this distance will appear to change. This is the principle of this method.

The distance, h, can be calculated by:

$$h = d \sin(\theta_m + \theta_e) \qquad \text{i}$$

Expanding this gives:

$$h = d \sin\theta_m \cos\theta_e + d \cos\theta_m \sin\theta_e \qquad \text{ii}$$

Transforming to Cartesian coordinates, $$x = d \cos\theta_m \text{ and } y = d \sin\theta_m, \qquad \text{iii}$$

we have $$h = x \sin\theta_e + y \cos\theta_e.$$

However, for real data there will be some error, e, in the measurements, $$e = x \sin\theta_e + y \cos\theta_e - h.$$

Thus for a set of n measurements of d and $\theta$, we have $$e(h, \theta_e) = x \sin\theta_e + y \cos\theta_e - h\mathbf{1} \qquad \text{iv}$$

where $e=[e_1\ e_2\ \ldots\ e_n]$, $x=[x_1\ x_2\ \ldots\ x_n]$, $y=[y_1\ y_2\ \ldots\ y_n]$, and $\mathbf{1}=[1\ 1\ \ldots\ 1]$.

The best estimate of h is found by minimizing the sum of the errors, ie., by minimising $$E(h, \theta_e) = e^T e = \sum_{k=1}^{n} e_k^2$$

Where e are the errors written as a vector $$E(h, \theta_e) = (x \sin\theta_e + y \cos\theta_e - h\mathbf{1})^T (x \sin\theta_e + y \cos\theta_e - h\mathbf{1})$$

To find the minimum with respect to h is $h_0$, given by $$\frac{\partial E}{\partial h} = 2 \frac{\partial e^T}{\partial h} e = 0$$

or, from equation iv, $$-2\mathbf{1}^T (x \sin\theta_e + y \cos\theta_e - h_0 \mathbf{1}) = 0$$

so $$h_0 \mathbf{1}^T \mathbf{1} = \mathbf{1}^T x \sin\theta_e + \mathbf{1}^T y \cos\theta_e.$$

We have $$\mathbf{1}^T \mathbf{1} = \sum_{k=1}^{n} 1 \times 1 = n,\ \mathbf{1}^T x = \sum_{k=1}^{n} x_k = n\bar{x},\ \mathbf{1}^T y = \sum_{k=1}^{n} y_k = n\bar{y},$$

where $\bar{x}$ and $\bar{y}$ are the means values of sets of values of x and y respectively.

Therefore, the best estimate of h is:

$$h_0 = \bar{x} \sin\theta_e + \bar{y} \cos\theta_e.$$

Substituting for h in equation iv, $$e(h_0, \theta_e) = x\sin\theta_e + y\cos\theta_e - (\bar{x}\sin\theta_e + \bar{y}\cos\theta_e)\mathbf{1} \qquad \text{vi}$$
$$= (x - \bar{x}\mathbf{1})\sin\theta_e + (y - \bar{y}\mathbf{1})\cos\theta_e$$
$$= x_1 \sin\theta_e + y_1 \cos\theta_e$$

where we have defined $$x_1 = (x - \bar{x}\mathbf{1}) \text{ and } y_1 = (y - \bar{y}\mathbf{1}). \qquad \text{vii}$$

The sum of the squared errors are now given by $E(h_0, \theta_e) = e(h_0, \theta_e)^T e(h_0, \theta_e)$, and the best estimate of $\theta_e$ is found when $\partial E/\partial \theta_e = 2(\partial e/\partial \theta_e)^T e = 0$, and from equation vi this is $$\frac{\partial E}{\partial \theta_e} = (x_i^T \cos\theta_e - y_1^T \sin\theta_e)(x_1 \sin\theta_e + y_1 \cos\theta_e) = 0$$

or $\|x_1\|^2 \sin\theta_e \cos\theta_e - \|y_1\|^2 \sin\theta_e \cos\theta_e + x_1^T y_1 \cos^2\theta_e - y_1^T x_1 \sin^2\theta_e = 0$.

Rearranging (and using $y_1^T x_1 = x_1^T y_1$) gives $$(\|x_1\|^2 - \|y_1\|^2) \sin 2\theta_e = 2 x_1^T y_1 \cos 2\theta_e$$

Therefore, the alignment error $\theta_e$ can be found from the equation below $$\theta_e = \frac{1}{2} \tan^{-1} \left( \frac{2 x_i^T y_1}{\|x_1\|^2 - \|y_1\|^2} \right). \qquad \text{viii}$$

NB We note $$x_1^T y_1 = \sum_{k=1}^{n}(x_k - \bar{x})(y_k - \bar{y}),$$

$$\|x_1\|^2 = x_1^T x_1 = \sum_{k=1}^{n}(x_k - \bar{x})^2,$$

$$\|y_1\|^2 = \sum_{k=1}^{n}(y_k - \bar{y})^2,$$

where $x_k$ and $y_k$ are obtained from the radar measurements of d and $\theta_m$ through equations iii, and $\bar{x}$ and $\bar{y}$ are given by $$\bar{x} = \frac{1}{n}\sum_{k=1}^{n} x_k,$$

$$\bar{y} = \frac{1}{n}\sum_{k=1}^{n} y_k.$$

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle radar system, comprising;
    radar means for measuring a bearing of objects in front of a host vehicle and for measuring a distance of said objects from the host vehicle;
    radar Doppler filter means for measuring an apparent speed relative to the vehicle, for of said objects in front of the host vehicle;
    a host vehicle speed sensor;
    stationary object identifier means for identifying as stationary objects, those objects whose apparent speed, relative to the host vehicle is equal and opposite to sensed speed of a host vehicle; and
    computer means for detecting a misalignment of a radar boresight of said radar means relative to a direction of motion of the host vehicle and for applying an appropriate correction, as a function of changes of measured bearing with measured distance to stationary objects identified by said stationary object identifier means.

2. The radar system as claimed in claim 1, wherein;
    the system recognizes as radar returns from a vehicle ahead in the same lane, only those radar returns which are received in a predetermined narrow beam centered on the direction of motion of the host vehicle; and
    the correction applied by the computer means comprises offsetting the beam such that boresight misalignment is compensated for the boresight is aligned with the direction of motion.

3. The radar system as claimed in claim 2, wherein the system takes account only of radar returns from within a predetermined narrow angle centered on the direction of vehicle motion, taking into account any angular boresight misalignment.

4. The radar system as claimed in claim 1, wherein;
    the radar means is arranged to obtain multiple measurements of distance and bearing for an identified stationary object; and
    the computer means determines a misalignment angle $\theta_e$ of the radar boresight with respect to the direction of the motion of the host vehicle by processing the multiple measurements according to a measurement error minimization routine which reduces the effect of errors in the multiple measurements of the computation of $\theta_e$.

5. An automobile radar system according to claim 4, wherein $\theta_e$ is determined in accordance with the relationship:

$$\theta_e = \frac{1}{2}\tan^{-1}\left(\frac{2x_1^T y_1}{\|x_1\|^2 - \|y_1\|^2}\right).$$

6. A vehicle cruise control system comprising a vehicular radar system as claimed in claim 1.

7. A vehicle cruise control system as claimed in claim 6, further comprising a brake pressure sensor, a gear box sensor, a steering angle sensor, and a throttle sensor.

8. A vehicle cruise control system as claimed in claim 7, wherein the steering angle sensor provides data indicative of a deviation from a forward motion direction of the host vehicle, whereby curved directions of travel of the host vehicle travel are taken into account when applying corrections.

* * * * *